US012657590B2

(12) United States Patent
Ezrielev et al.

(10) Patent No.: US 12,657,590 B2
(45) Date of Patent: Jun. 16, 2026

(54) LAST RESORT ACCESS TO DIGITAL WALLET OR DIGITAL ASSETS WITH SMART CONTRACTS AND SHADOW ASSETS

(71) Applicant: Dell Products L.P., Round Rock, TX (US)

(72) Inventors: Ofir Ezrielev, Be'er Sheba (IL); Yehiel Zohar, Sderot (IL); Lee Serfaty, Be'er Sheba (IL)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 18/307,979

(22) Filed: Apr. 27, 2023

(65) Prior Publication Data

US 2024/0362639 A1      Oct. 31, 2024

(51) Int. Cl.
*G06Q 20/40* (2012.01)
*G06Q 20/02* (2012.01)
*G06Q 20/36* (2012.01)

(52) U.S. Cl.
CPC ......... *G06Q 20/4016* (2013.01); *G06Q 20/02* (2013.01); *G06Q 20/36* (2013.01); *G06Q 2220/00* (2013.01)

(58) Field of Classification Search
CPC .................................................... G06Q 40/00
USPC .......................................................... 705/35
See application file for complete search history.

(56) References Cited

U.S. PATENT DOCUMENTS

| | | | | |
|---|---|---|---|---|
| 11,972,422 | B2 * | 4/2024 | Wright | H04L 9/3236 |
| 2020/0013025 | A1 * | 1/2020 | Verma | H04L 9/3297 |
| 2020/0201964 | A1 * | 6/2020 | Nandakumar | H04L 63/0861 |
| 2020/0349147 | A1 * | 11/2020 | Vukich | G06Q 20/065 |
| 2021/0133359 | A1 * | 5/2021 | Liu | G06F 21/64 |
| 2021/0150517 | A1 * | 5/2021 | Xiao | H04L 9/0618 |
| 2021/0182423 | A1 * | 6/2021 | Padmanabhan | H04L 9/3271 |
| 2023/0045071 | A1 * | 2/2023 | Kalaldeh | G06Q 30/018 |
| 2023/0153812 | A1 * | 5/2023 | Robotham | G06Q 20/401 |
| | | | | 705/67 |
| 2023/0177167 | A1 * | 6/2023 | Chan | H04L 63/10 |
| | | | | 726/1 |
| 2023/0186291 | A1 * | 6/2023 | Haddad | G06Q 20/363 |
| | | | | 705/64 |
| 2023/0394481 | A1 * | 12/2023 | Padmanabhan | H04L 9/50 |
| 2024/0135364 | A1 * | 4/2024 | Agudelo | G06Q 20/389 |
| 2024/0143731 | A1 * | 5/2024 | Zamir | H04L 9/3271 |
| 2024/0171589 | A1 * | 5/2024 | Ezrielev | H04L 63/0823 |
| 2024/0171602 | A1 * | 5/2024 | Ezrielev | H04L 63/1433 |

(Continued)

*Primary Examiner* — Kirsten S Apple

(74) *Attorney, Agent, or Firm* — Workman Nydegger

(57)      ABSTRACT

Protecting digital assets is disclosed. A primary digital asset associated with a shadow asset are stored, in a first and a second digital wallet. The primary digital asset and the shadow asset are each associated with respective smart contracts. When the primary smart contract executes, the second smart contract also executes. These smart contracts convert the shadow asset to be the primary digital asset and invalidate the original digital asset. This allows smart contracts to effectively protect a digital asset using digital wallets associated with different private keys and without having to actually transfer the digital asset. The activation of the shadow asset and invalidation of the original primary digital asset can be effected without a private key. The smart contracts execute when the conditions are satisfied.

18 Claims, 7 Drawing Sheets

(56)                     References Cited

U.S. PATENT DOCUMENTS

| 2024/0305643 | A1* | 9/2024 | Ezrielev | .................. H04L 63/20 |
| 2024/0362126 | A1* | 10/2024 | Ezrielev | .............. G06F 11/1469 |
| 2024/0362621 | A1* | 10/2024 | Ezrielev | ................ G06Q 20/36 |
| 2024/0362639 | A1* | 10/2024 | Ezrielev | ................ G06Q 20/02 |

* cited by examiner

LAST RESORT ACCESS TO DIGITAL WALLET OR DIGITAL ASSETS WITH SMART CONTRACTS AND SHADOW ASSETS

FIELD OF THE INVENTION

Embodiments of the present invention generally relate to blockchain and related networks. More particularly, at least some embodiments of the invention relate to systems, hardware, software, computer-readable media, and methods for protecting and accessing digital assets.

BACKGROUND

Generally stated, blockchain technology is a technology that allows data to be stored in blocks that are linked together. Blockchain technology can be used for various purposes including, by way of example, energy, finance, media, entertainment, and retail purposes. A well-known use of a blockchain network is to store digital assets such as cryptocurrency. Blockchain networks allow the digital assets and transactions related to the digital assets to be recorded and tracked.

A blockchain network may have certain advantageous features. For example, blockchain networks are often decentralized. In decentralized blockchain networks, a single individual or a single entity does not have total control of the blockchain network or unilateral decision-making capabilities. Further, a blockchain network is often transparent such that users or members can have confidence in the data stored in the blockchain network and in changes made to data stored in the blockchain network. Members of a blockchain network can trust the blockchain network because the data is available to all members of the blockchain network and all transactions relative to the data are stored in the blockchain network and visible to the members.

Blockchain networks are also immutable. Consequently, no user can tamper with a transaction once the transaction has been recorded in the blockchain network. In order to change a transaction, it is necessary to add the change to the blockchain network such that the data and all changes or transactions related to the data are visible.

Even though blockchains provide immutability and transparency, the ability to use and access the data or to perform transactions often depends on the use of a private cryptographic key. The control over and/or access of a user to their data (or their digital assets) in the blockchain network may be compromised if the user's private key is not safeguarded.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
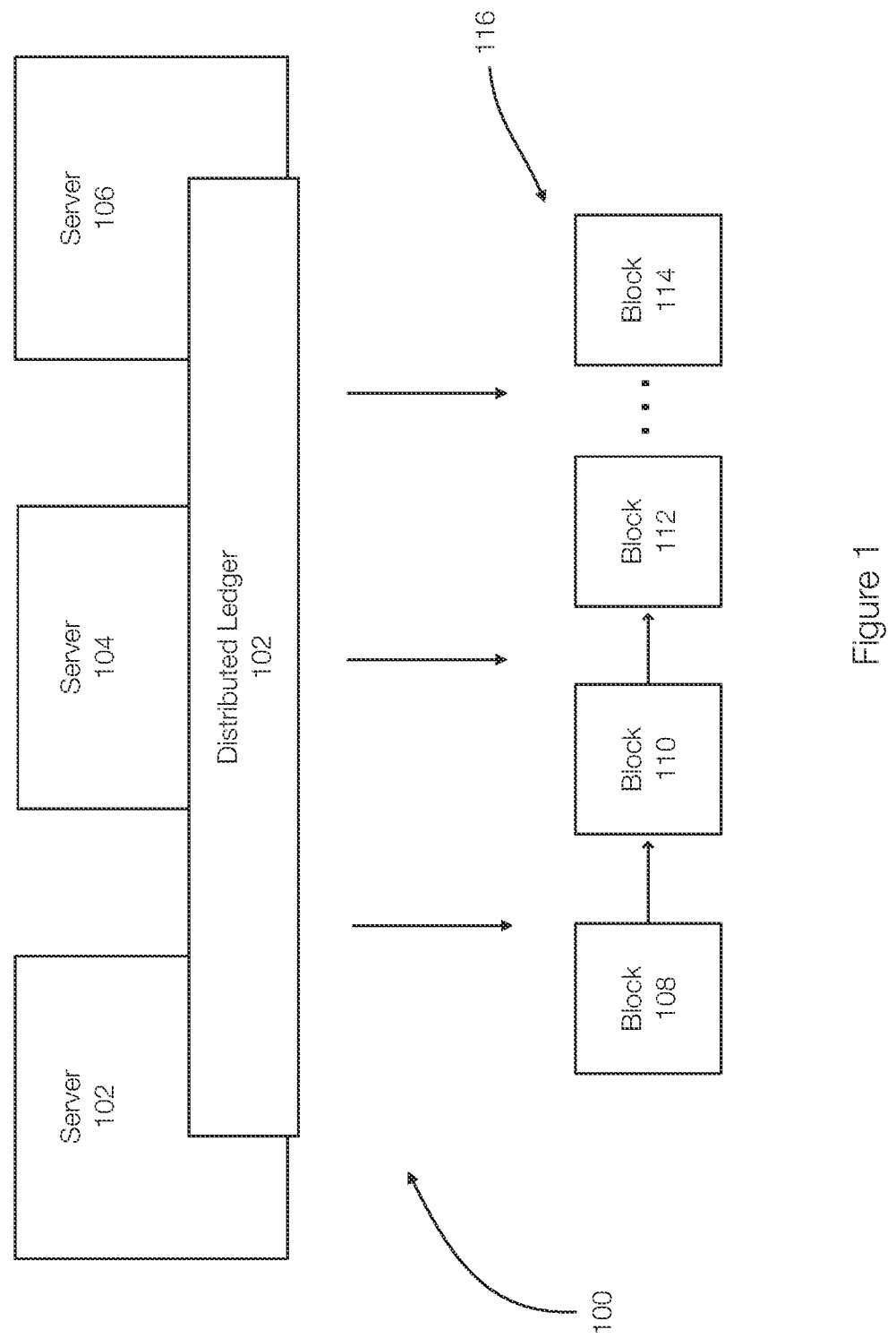
FIG. 1 discloses aspects of a blockchain network.

Embodiments of the present invention generally relate to blockchain networks and smart contracts. More particularly, at least some embodiments of the invention relate to systems, hardware, software, computer-readable media, and methods for protecting digital assets stored in digital wallets in a blockchain network. More specifically, embodiments of the invention relate to protecting a digital asset when a private key to the digital wallet storing the digital asset has been lost or is unavailable or when the digital asset is under attack or threatened.

In general, example embodiments of the invention relate to blockchain network operations, digital wallet operations, smart contract operations, zero-trust operations, asset protection operations, digital asset shadow or clone related operations, and the like or combinations thereof.

Blockchain networks (or blockchains) can be used to store and track information of any kind such as medical records, financial records, confidential information, digital assets, school records, business transactions, online payments, cryptocurrencies, or the like. Embodiments of the invention are discussed in the context of digital assets but may be adapted to other data or content stored in blockchain networks. Examples of digital assets include, but are not limited to, anything that is stored digitally and has value to an organization. Thus, data such as documents, audio, videos, logos, websites, code, and other data are examples of digital assets. Digital assets also include nonfungible tokens, cryptocurrency, security tokens, digital currencies, or the like.

A blockchain, which may also be referred to as a distributed ledger or a distributed database, often store information in blocks that are usually related to each other both cryptographically and chronologically. When new data or information is added to a blockchain or when a transaction is performed relative to a digital asset, a new block may be created, filled with the relevant data or information, and chained to the blockchain. If there is a need to change data in an existing block, the change is usually reflected in a new block because existing blocks are immutable. All transactions relative to a specific digital asset may be viewable in the blockchain network.

In fact, the immutability and transparency of blockchains are some of its advantages. Blockchains are usually implemented in a decentralized manner, which helps ensure that no individual user or group has control of the blockchain. For example, data or information, once entered into the blockchain, cannot be removed from the blockchain. Consequently, transactions are permanently recorded and viewable to anyone with access to the blockchain.

While the irrevocability and immutability of a transaction is often viewed as a benefit, the irrevocability of a transaction and the immutability of the blockchain can also be viewed as a disadvantage. For example, there is often no ability to access a digital asset if the user's private key is lost or forgotten. Thus, a lost or otherwise unavailable key may result in a digital asset that, while present in the blockchain, is effectively lost. Many of the threats facing digital assets are known and many of the threats are unknown.

Protecting digital assets from threats, user carelessness, and other destructive or unintentional actions can be achieved using shadow assets. A shadow asset, in one example, is a copy of a primary digital asset. The shadow asset may be held in logical escrow and may not be activated. When access to a digital asset is lost or potentially lost (e.g., subject to a threat or security issue), embodiments of the invention may invalidate the primary digital asset and activate the shadow asset. Thus, the shadow asset is converted to become the primary data asset. This allows the now invalidated asset to remain in place while activating the corresponding shadow asset, which already exists in the blockchain.

Embodiments of the invention thus relate to protecting digital assets and to protecting access to the digital assets. By way of example only, embodiments of the invention relate to protecting digital assets in various scenarios, such as when a primary digital asset has had no activity for a predetermine time, when suspicious activity is detected relative to the primary digital asset, when a private key is lost/unavailable, or the like or combination thereof.

The ability to access a digital wallet and primary digital assets stored therein is achieved by holding the primary digital asset using a smart contract. In one example, a shadow asset, which may be a clone or copy of the primary digital asset, may exist in another digital wallet. The smart contract may specify conditions related to the primary digital asset. When the conditions are satisfied, the primary digital asset is invalidated and the shadow asset becomes the primary digital asset. The digital wallet holding the shadow asset may be associated with the same user or another user trusted by the original user.

Embodiments of the invention improve the security of a blockchain by changing the location of the primary digital asset or other data when the primary digital asset is threatened or subject to loss. In one example, the primary digital asset stored in a blockchain is associated with a script or a smart contract. The smart contract may be configured to execute an action (a transaction in the blockchain) when certain conditions are satisfied. The actions may include invalidating a primary digital asset and activating or triggering the activation of a shadow asset stored in the blockchain that is associated with another smart contract. The shadow asset May be held in an escrow smart contract and becomes a primary digital asset when relevant conditions are satisfied.

The smart contract associated with the primary digital asset may be triggered by various mechanisms. By way of example, attempts to access the primary digital asset by a user that is not on a permitted list may trigger execution of the smart contract. Attempts to perform unauthorized transactions may trigger the smart contract. Indications that the private key has been compromised or lost may trigger the smart contract. For example, the smart contract may be configured to invoke the escrow smart contract when a threshold time period with no activity on the digital access has passed or when suspicious activity is detected. The conditions required to trigger the smart contract may be known only to the user or those with whom the user chooses to share the conditions.

Even if an attacker knows the primary conditions that will trigger the smart contract, the attacker is unable to access the digital asset because the smart contract causes the shadow asset to become the primary digital asset and invalidate the original primary digital asset. The immutability of the blockchain prevents the attacker from altering the smart contract, which is in the blockchain. However, the smart contract allows the user to access the digital wallet in the event that the private key is lost or otherwise unavailable. The smart contract may be configured to provide protections related to both compromised private keys and/or lost private keys and related to suspicious activity.

FIG. 1 discloses aspects of a blockchain. The blockchain 100 is discussed in the context of digital assets. In this example, the blockchain 100 is implemented as a digital ledger 102 in which transactions relative to digital assets are recorded. The ledger 102 is distributed across multiple computing devices, represented by servers 102, 104, and 106. In one example, the distributed ledger 102 is implemented in a peer-to-peer network.

The ledger 102 includes a chain of blocks 116. The blocks 116 in the blockchain 100 or the ledger 102 are represented by blocks 108, 110, 112, and 114. These blocks may be linked cryptographically and chronologically. Each time a new block is added, the new block is added to the end of the blockchain in one example. As transactions are performed, blocks are added to the blockchain 100.

Figure 2:
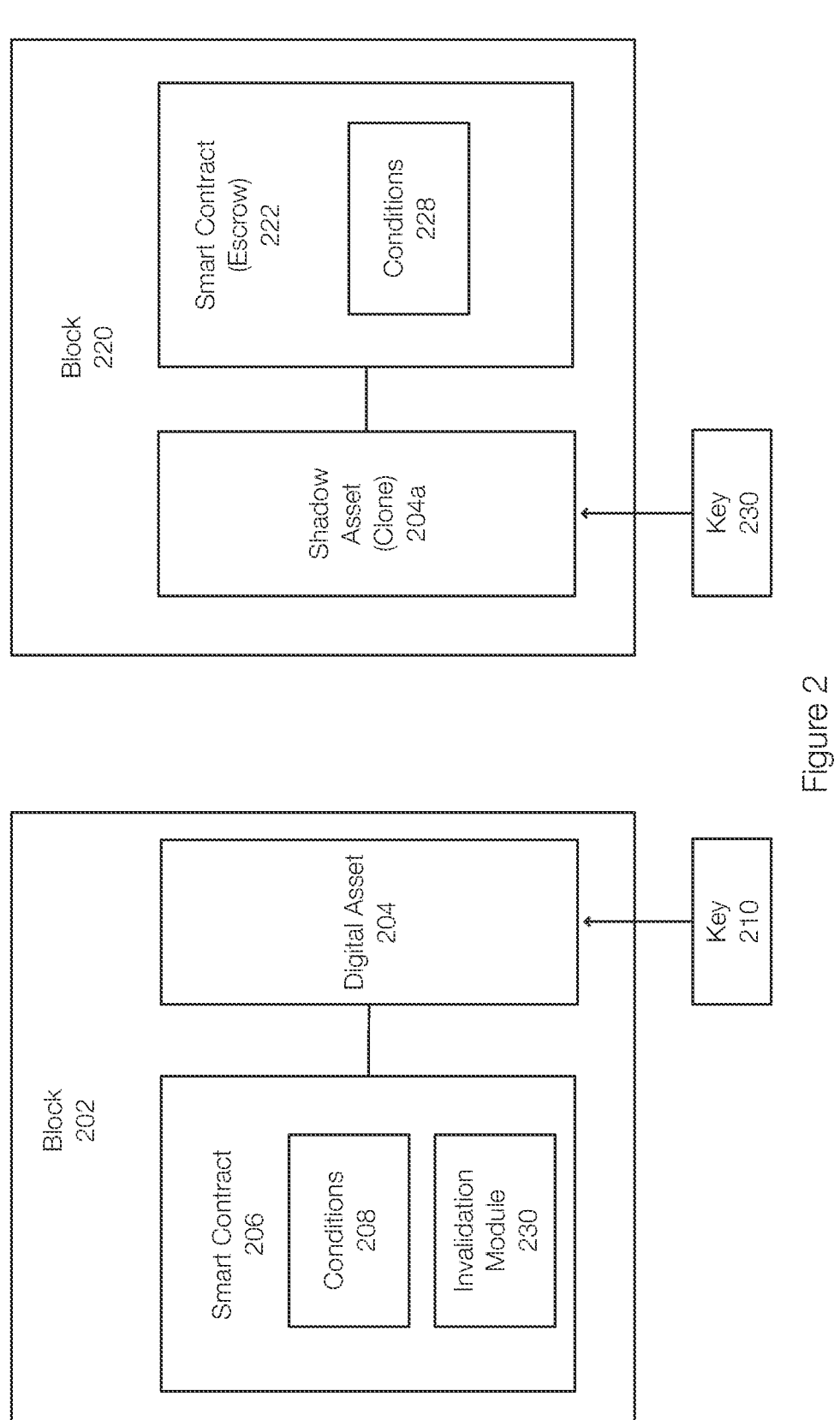
FIG. 2 discloses aspects of a blockchain network with last resort access.

FIG. 2 discloses aspects of protecting digital assets. FIG. 2 illustrates a block 202 that includes data. The data includes a digital asset 204, which may be accessed using a private key 210, and a smart contract 206. The smart contract 206 further includes or implements a mechanism to protect the digital asset 204 in the event that the private key is lost, suspicious activity occurs with respect to the digital asset 204 (or the private key), or the like. In this example, the smart contract 206 includes conditions 208 that result in protecting the digital asset 204 when the conditions 208 are satisfied of fulfilled.

Protecting the digital asset 204 includes activating a shadow asset (clone or copy of the primary digital asset 204) 204a. The shadow asset 204a is stored in a different block 220 and associated with a different private key 230. The shadow asset 204a is a secondary asset that is not active or not activated until the conditions 208 are satisfied. The smart contract 206 executes when the conditions 208 (and/or the conditions 228) are satisfied to convert the shadow asset 204a into the primary digital asset and invalidate the digital asset 204.

More specifically, converting the shadow asset 204a into the primary digital asset occurs when the conditions 228 of the escrow smart contract 222 are satisfied. The conditions 228 may include execution of the smart contract 206. In this example, the digital asset 204 is not transferred from one digital wallet (or block) to another digital wallet (or block). Rather, an already existing shadow asset 204a is converted to be the primary digital asset and the digital asset 204 is invalidated.

The invalidation module 230 process is part of the smart contract 206 and is executed along with the execution of the smart contract 206. The smart contract 206 ensures that the shadow asset 204a is the primary digital asset being protected by invalidating the digital asset 204 when required. Further, the smart contract 206 may prevent access to the digital asset 204 once execution of the smart contract 206 begins execution or as soon as the conditions 208 are satisfied.

The conditions 208 of the smart contract 206 may vary. For example, the conditions 208 may include a transfer period. If the digital asset is not accessed in a manner that required the private key during the transfer period, this may suggest that the private key is lost or unavailable. Thus, the shadow asset 204a is converted to be the primary digital asset if the transfer period expires. In another example, the conditions 208 may only allow certain operations or actions to be performed relative to the digital asset 204. If a transaction or order is received that is not allowed, this suggests that the private key is compromised and results in execution of the smart contract 206. In another example, repeated attempts to access the digital key may be made to access or transfer the digital asset 204 and this scenario may trigger the smart contract 206. The conditions 208 may identify other situations or scenarios that identify suspicious actions in a manner that allows the smart contract 206 to be executed when the digital asset 204 is under threat or when the actions related to the digital asset 204 are threatening or suspicious.

The procedure of converting the shadow asset 204a to be the primary digital asset and invalidating the digital asset 204 are coded into the smart contract 206 and 222. Thus, execution of the smart contract 206 results in the digital asset 204 being invalidated and execution of the smart contract 222 releases the shadow asset 204a from escrow and causes the shadow asset 204a to become the primary digital asset.

Figure 3A:
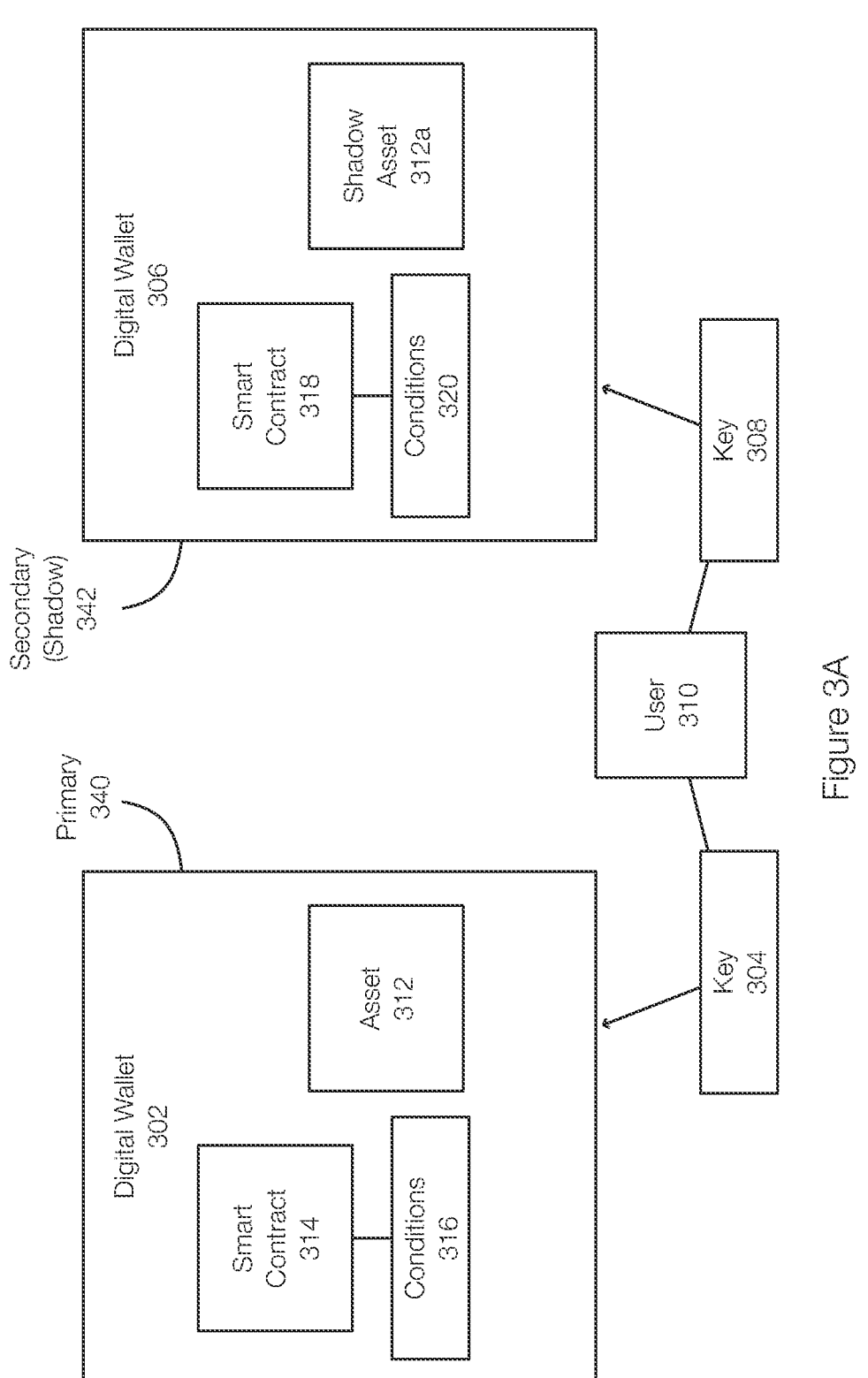
FIG. 3A discloses aspects of digital wallets that protect digital assets using shadow assets.
Figure 3B:
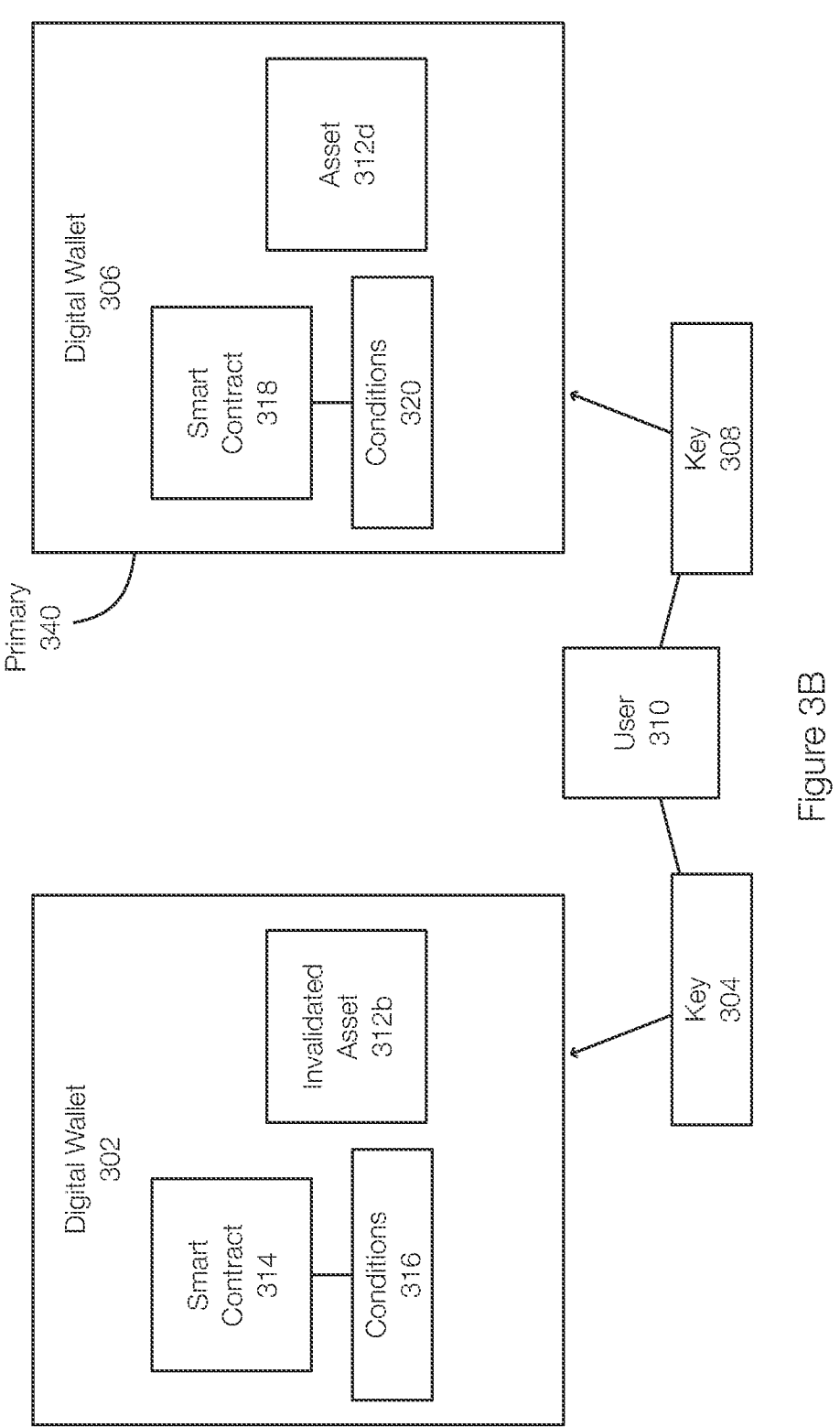
FIG. 3B discloses aspects of converting a shadow asset into a primary digital asset.

FIG. 3A discloses aspects of protecting a digital asset using a shadow asset in the context of digital wallets, which may be implemented in a blockchain network, prior to activating the shadow asset. FIG. 3B discloses aspects of protecting a digital asset after activating the shadow asset.

FIG. 3A illustrates a primary digital wallet 302 that is currently designated as a primary 340 wallet and a digital wallet 306 that is currently designated as a secondary or shadow 342 digital wallet. The digital wallet 302 and the digital wallet 306 are implemented, in one example, using blockchain technologies. The digital wallet 306 is an example of a last resort digital wallet. The digital wallet 302 may include addresses and digital keys. The digital wallet 302 is configured to enable access to the digital assets stored in the blockchain. More specifically, a private digital key 304 enables access to and control of the asset 312.

In this example, the digital wallet 302 and the digital wallet 306 are both associated with a user 310. The digital wallet 302 is associated with a key 304 and the digital wallet 306 is associated with a key 308. The keys 304 and 308 are associated with different wallets and are separate and distinct in one example and may be stored in different repositories or locations. The keys 304 and 308 may be private keys that are associated with corresponding public keys.

More specifically, a digital wallet 302 may be associated with both a private key and a public key. The private key may be, for example, an alphanumeric code that may be used for cryptographical purposes. The digital wallet 302 may be a set of public addresses and private keys. Anyone can deposit a digital asset to a public address using the public key. However, digital assets generally cannot be removed or transferred from an address without the appropriate private key.

It is important to safeguard the key 304 (the private key). When a transaction from the digital wallet 302 is initiated, a digital signature is created by processing the transaction with the key 304. Once the transaction is authorized and broadcast or recorded in the blockchain, the transaction cannot be changed. Consequently, the asset 312 cannot be accessed if the key 304 is lost.

In this example, the asset 312 is associated with a smart contract 314 that includes conditions 316. When the conditions 316 are satisfied, the smart contract executes to convert or activate the shadow asset 312a in the digital wallet 306 into the primary digital asset and to invalidate the digital asset 312 in the digital wallet 302.

The shadow asset 312a is also associated with a smart contract 318 that includes conditions 320. When the conditions 320 are satisfied, the shadow asset 312a becomes the primary digital asset. The conditions 320 may include execution of the smart contract 314 and/or successful invalidation of the asset 312.

FIG. 3B thus illustrates aspects of protecting a digital asset after execution of the smart contract 314. The digital asset 312 becomes the invalidated asset 312b. The shadow asset 312a becomes the primary digital asset 312d. The digital wallet 306 is designated the primary 340 digital wallet. Because the asset 312 is now the invalidated asset 312b, the digital wallet 302 holds nothing of value in this example.

Requests to contact or access the invalidated asset 312b may be rejected with redirection information in one example. Thus, the smart contract 314 may also include redirection information after the asset 312 becomes the invalidated asset 312b. The destination of the redirection information may be determined by default or by the user 310 when the smart contract 314 is generated and associated or integrated with the asset 312.

If the user 310 desires or for other reasons, another digital wallet that is configured to another secondary or shadow digital wallet may be generated to hold a new shadow asset that is associated with a new escrow smart contract. This may be created upon execution of the smart contract 318. Thus, execution of the smart contract 318, in addition to allowing the asset 312a to become the primary digital asset 312d, may also create a new shadow asset to protect the primary digital asset 312d.

Stated differently, execution of the smart contract 314 and of the smart contract 318 effectively releases the asset 312a from escrow such that the asset 312a become the primary digital asset 312d. FIGS. 3A and 3B illustrate an example where the asset 312 is associated with the smart contract 314 and the shadow asset 312a is associated with a smart contract 318.

Figure 3C:
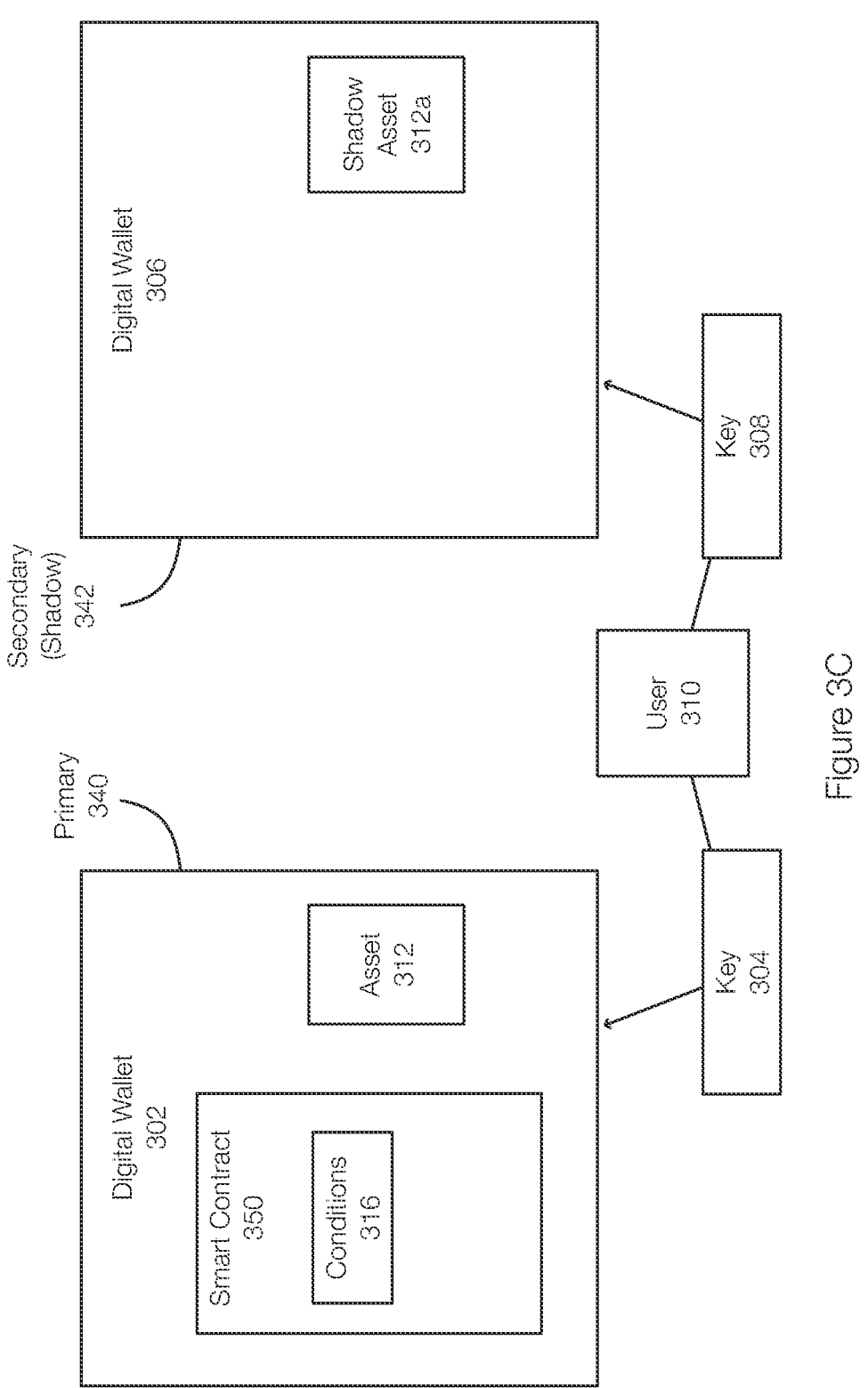
FIG. 3C discloses aspects of converting a shadow asset into a primary digital asset with a single smart contract.

FIG. 3C illustrates an example of protecting assets using a single smart contract. In this example, the asset is associated with a smart contract 350 that includes conditions 316. In this example, when the conditions 316 are satisfied, the smart contract 350 performs the functions of the smart contracts 314 and 318 to invalidate the asset 312 and make the shadow asset 312a the primary digital asset 312d. Further, the smart contract 350 may also generate a new shadow asset and associate the now primary digital asset 312d with a smart contract similar to the smart contract 350.

Figure 4:
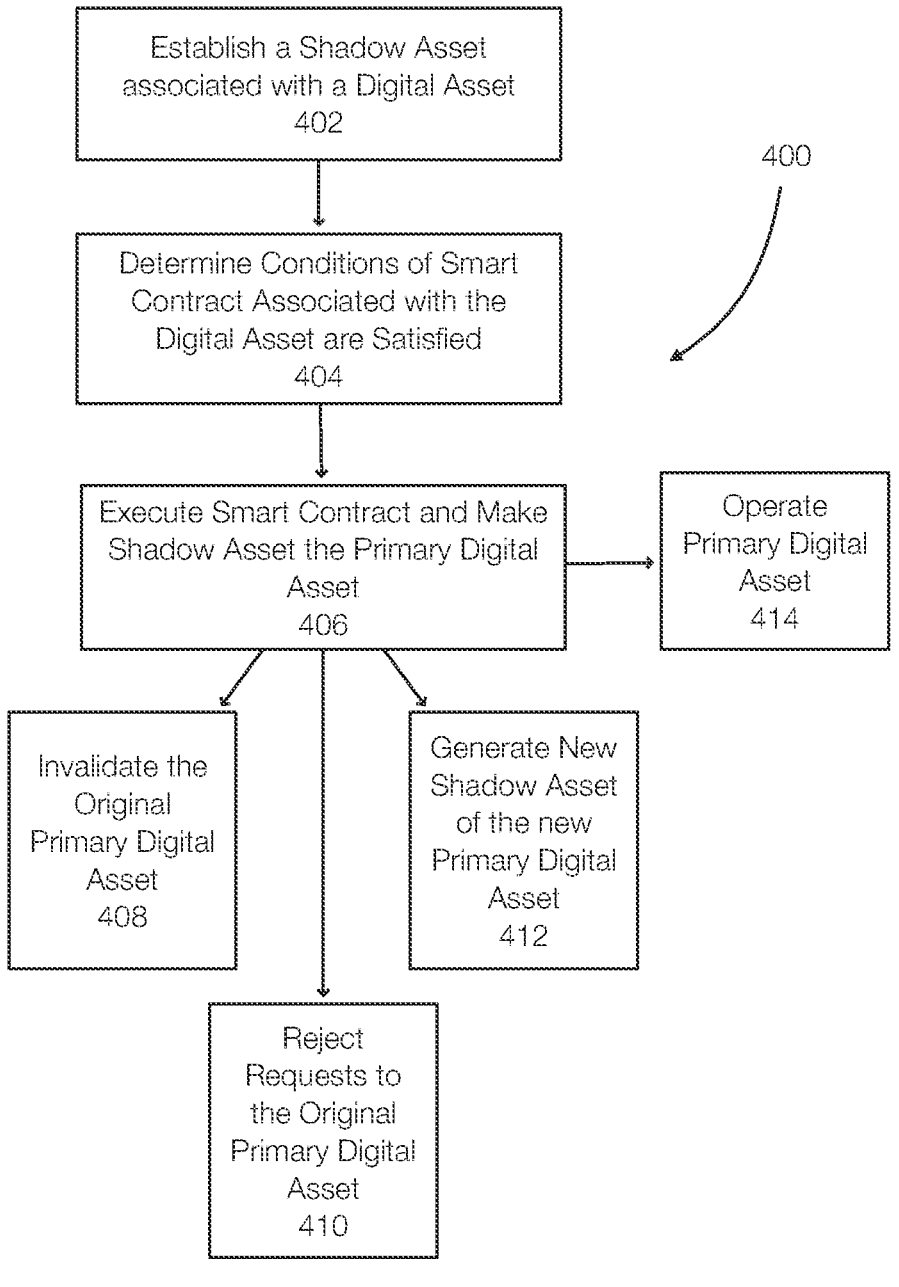
FIG. 4 discloses aspects of a method for protecting digital assets stored in a blockchain network using shadow assets.

FIG. 4 discloses aspects of protecting a digital asset using shadow assets. In the method 400, a shadow asset is established 402 and associated with a primary digital asset. In this example, the primary digital asset is stored with or associated with a primary smart contract. The shadow asset is associated with an escrow smart contract. These smart contracts include conditions that, when satisfied, invalidate the current primary digital asset and convert the shadow asset into the new or current primary digital asset. In effect, the original primary digital asset is transferred to a new digital wallet without having to actually transfer the primary digital asset. Rather, the shadow asset is activated or converted into the primary digital asset by execution of these two smart contracts.

When it is determined 404 that conditions of the primary smart contract are satisfied, the primary smart contact executes to invalidate the current primary digital asset. The escrow smart contract associated with the shadow asset may determine (receive a signal from the primary smart contract) that the primary smart contract of the primary digital asset has executed. This triggers the escrow smart contract to execute, which converts 406 the shadow asset to be the primary digital asset.

The actual invalidation of the original primary digital asset may be timed to occur at an appropriate time. Thus, the primary smart contract invalidates 408 the original primary digital asset. Requests directed to the invalided primary digital asset are rejected 410 or redirected.

When the shadow asset is converted to be the primary digital asset, a new shadow digital asset may be created or generated 412. The now primary digital asset (the converted shadow asset) operates 414 as normal and transactions can be performed with respect to the primary digital asset.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, blockchain operations, smart contract operations, data asset protection operations, or the like. More generally, the scope of the invention embraces any operating environment in which the disclosed concepts may be useful.

New and/or modified data collected and/or generated in connection with some embodiments, may be stored in a data or storage environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data related functionality. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing. The term data may also refer to digital assets or other types of objects or information capable of being stored in blockchain networks.

It is noted that any operation(s) of any of the methods disclosed herein including the Figures, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: maintaining a primary digital asset in a first digital wallet, wherein the primary digital asset is associated with a first smart contract, determining that conditions of the first smart contract are satisfied, and executing the first smart contract, wherein the first smart contract converts the shadow asset to be a current primary digital asset and wherein the first smart contract invalidates the primary digital asset stored in the first digital wallet.

Embodiment 2. The method of embodiment 1, a transfer period, wherein the transfer period is completed with a private key associated with the primary digital asset is not used to access the primary digital asset during a determined time period; or identifying suspicious activity related to the primary digital asset stored in the first digital wallet.

Embodiment 3. The method of embodiment 1 and/or 2, further comprising a second smart contract associated with the shadow asset, wherein the second smart contract is configured to convert the shadow asset to be the current primary digital asset, wherein the second smart contract is triggered by execution of the first smart contract.

Embodiment 4. The method of embodiment 1, 2, and/or 3, wherein the suspicious activity includes receiving a request for the primary asset that is not allowed by the conditions.

Embodiment 5. The method of embodiment 1, 2, 3, and/or 4, wherein the suspicious activity includes receiving a request for the primary asset from a location that is not specifically allowed by the conditions.

Embodiment 6. The method of embodiment 1, 2, 3, 4, and/or 5, wherein the suspicious activity includes a recipient that is not allowed by the conditions.

Embodiment 7. The method of embodiment 1, 2, 3, 4, 5, and/or 6, wherein the second smart contract is associated with second conditions that include execution of the first smart contract.

Embodiment 8. The method of embodiment 1, 2, 3, 4, 5, 6, and/or 7, wherein the second smart contract is configured to hold the shadow asset in escrow.

Embodiment 9. The method of embodiment 1, 2, 3, 4, 5, 6, 7, and/or 8, further comprising invalidating the primary digital asset stored in the first digital wallet.

Embodiment 10. The method of embodiment 1, 2, 3, 4, 5, 6, 7, 8, and/or 9, further comprising redirecting requests for the invalidated primary digital asset as set forth in the first smart contract.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or service may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
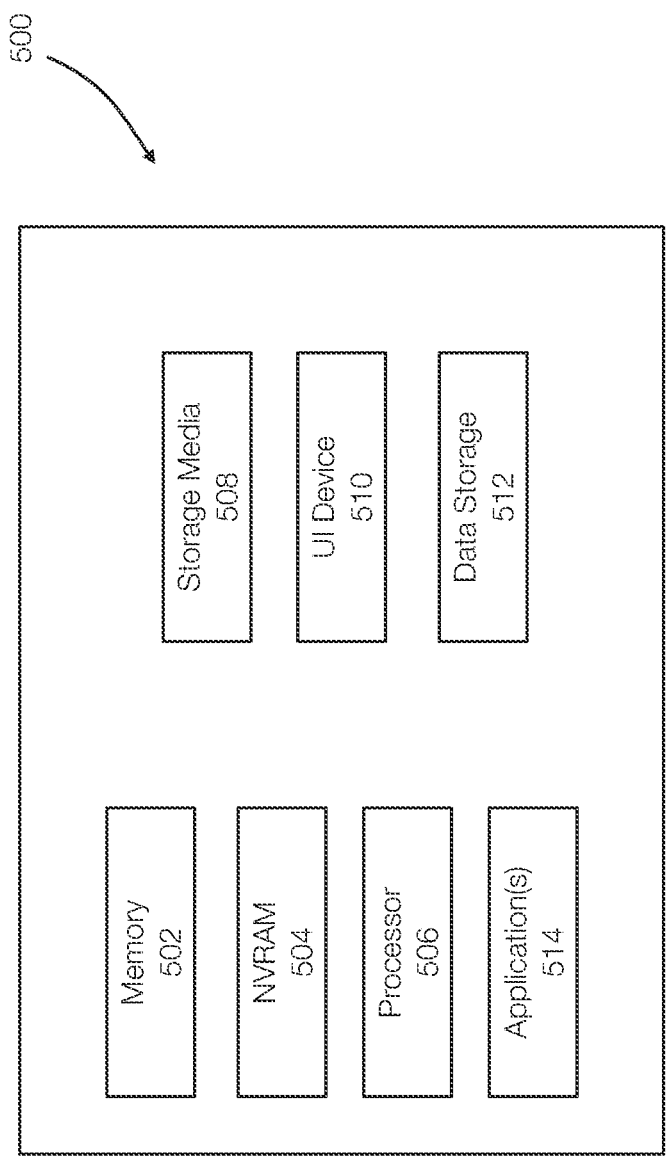
FIG. 5 discloses aspects of a computing device, a computing system, or a computing entity.

With reference briefly now to FIG. 5, any one or more of the entities disclosed, or implied, herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random-access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

associating an original primary digital asset that is stored on a distributed ledger with a first digital wallet, the first digital wallet having an associated a first private key that is configured to allow access to the original primary digital asset via the first digital wallet, wherein the primary digital asset is associated with a first smart contract that is stored on the distributed ledger and configured to be executed upon the satisfaction of first smart contract conditions, and wherein the primary digital asset has not been accessed for a predetermined period of time or a suspicious access attempt is detected;

determining that the first smart contract conditions are satisfied;

executing the first smart contract without using the first private key associated with the first digital wallet;

wherein execution of the first smart contract causes a conversion of a first shadow asset that is a clone of the original primary digital asset, is stored on the distributed ledger prior to the execution of the first smart contract, and is associated with a second digital wallet to become a current primary digital asset, and wherein the execution of the first smart contract causes the invalidation of the original primary digital asset stored on the distributed ledger, wherein the first private key associated with the first digital wallet is different from a second private key associated with the second digital wallet and configured to allow access to the current primary digital asset via the second digital wallet; and generating a second shadow asset that is a clone of the current primary digital asset on the distributed ledger, and generating a third private key associated with the third digital wallet, the third private key configured to allow access to the second shadow asset via the third digital wallet.

2. The method of claim 1, wherein the first smart contract conditions include:

a transfer period, wherein the transfer period is completed when the first private key associated with the original primary digital asset is not used to access the original primary digital asset during the determined time period; or identifying suspicious activity related to the original primary digital asset stored on the distributed ledger.

3. The method of claim 1, further comprising a second smart contract associated with the first shadow asset, wherein execution of the second smart contract is configured to cause the conversion of the first shadow asset to be the current primary digital asset, wherein execution of the second smart contract is triggered by execution of the first smart contract.

4. The method of claim 3, wherein the suspicious activity includes receiving a request for the original primary asset that is not allowed by the first smart contract conditions.

5. The method of claim 3, wherein the suspicious activity includes receiving a request for the original primary asset from a location that is not specifically allowed by the first smart contract conditions.

6. The method of claim 3, wherein the suspicious activity includes a recipient that is not allowed by the first smart contract conditions.

7. The method of claim 3, wherein the second smart contract is associated with second smart contract conditions that include execution of the first smart contract.

8. The method of claim 3, wherein the second smart contract is configured to hold the first shadow asset in escrow.

9. The method of claim 1, further comprising redirecting requests for the invalidated original primary digital asset as set forth in the first smart contract.

10. A non-transitory storage medium having stored therein instructions that are executable by one or more hardware processors to perform operations comprising:

associating an original primary digital asset that is stored on a distributed ledger with a first digital wallet, the first digital wallet having an associated a first private key that is configured to allow access to the original primary digital asset via the first digital wallet, wherein the primary digital asset is associated with a first smart contract that is stored on the distributed ledger and configured to be executed upon the satisfaction of first smart contract conditions, and wherein the primary digital asset has not been accessed for a transfer period or a suspicious access attempt is detected;

determining that the first smart contract conditions are satisfied;

executing the first smart contract without using the first private key associated with the first digital wallet;

wherein execution of the first smart contract causes a conversion of a first shadow asset that is a clone of the original primary digital asset, is stored on the distributed ledger prior to the execution of the first smart contract, and is associated with a second digital wallet to become a current primary digital asset and wherein the execution of the first smart contract causes the invalidation of the original primary digital asset stored on the distributed ledger, wherein the first private key associated with the first digital wallet is different from a second private key associated with the second digital wallet and configured to allow access to the current primary digital asset via the second digital wallet; and generating a second shadow asset that is a clone of the current primary digital asset on the distributed ledger, and generating a third private key associated with the third digital wallet, the third private key configured to allow access to the second shadow asset via the third digital wallet.

11. The non-transitory storage medium of claim 10 wherein the first smart contract conditions include:

a transfer period, wherein the transfer period is completed when the first private key associated with the original primary digital asset is not used to access the original primary digital asset the a determined time period; or identifying suspicious activity related to the original primary digital asset stored on the distributed ledger.

12. The non-transitory storage medium of claim 10, further comprising a second smart contract associated with the first shadow asset, wherein execution of the second smart contract is configured to cause the conversion of the first shadow asset to be the current primary digital asset, wherein execution of the second smart contract is triggered by execution of the first smart contract.

13. The non-transitory storage medium of claim 12, wherein the suspicious activity includes receiving a request for the original primary asset that is not allowed by the first smart contract conditions.

14. The non-transitory storage medium of claim 12, wherein the suspicious activity includes receiving a request for the original primary asset from a location that is not specifically allowed by the first smart contract conditions.

15. The non-transitory storage medium of claim 12, wherein the suspicious activity includes a recipient that is not allowed by the first smart contract conditions.

16. The non-transitory storage medium of claim 12, wherein the second smart contract is associated with second smart contract conditions that include execution of the first smart contract.

17. The non-transitory storage medium of claim 12, wherein the second smart contract is configured to hold the first shadow asset in escrow.

18. The non-transitory storage medium of claim 10, further comprising redirecting requests for the invalidated original primary digital asset as set forth in the first smart contract.

* * * * *